UNITED STATES PATENT OFFICE.

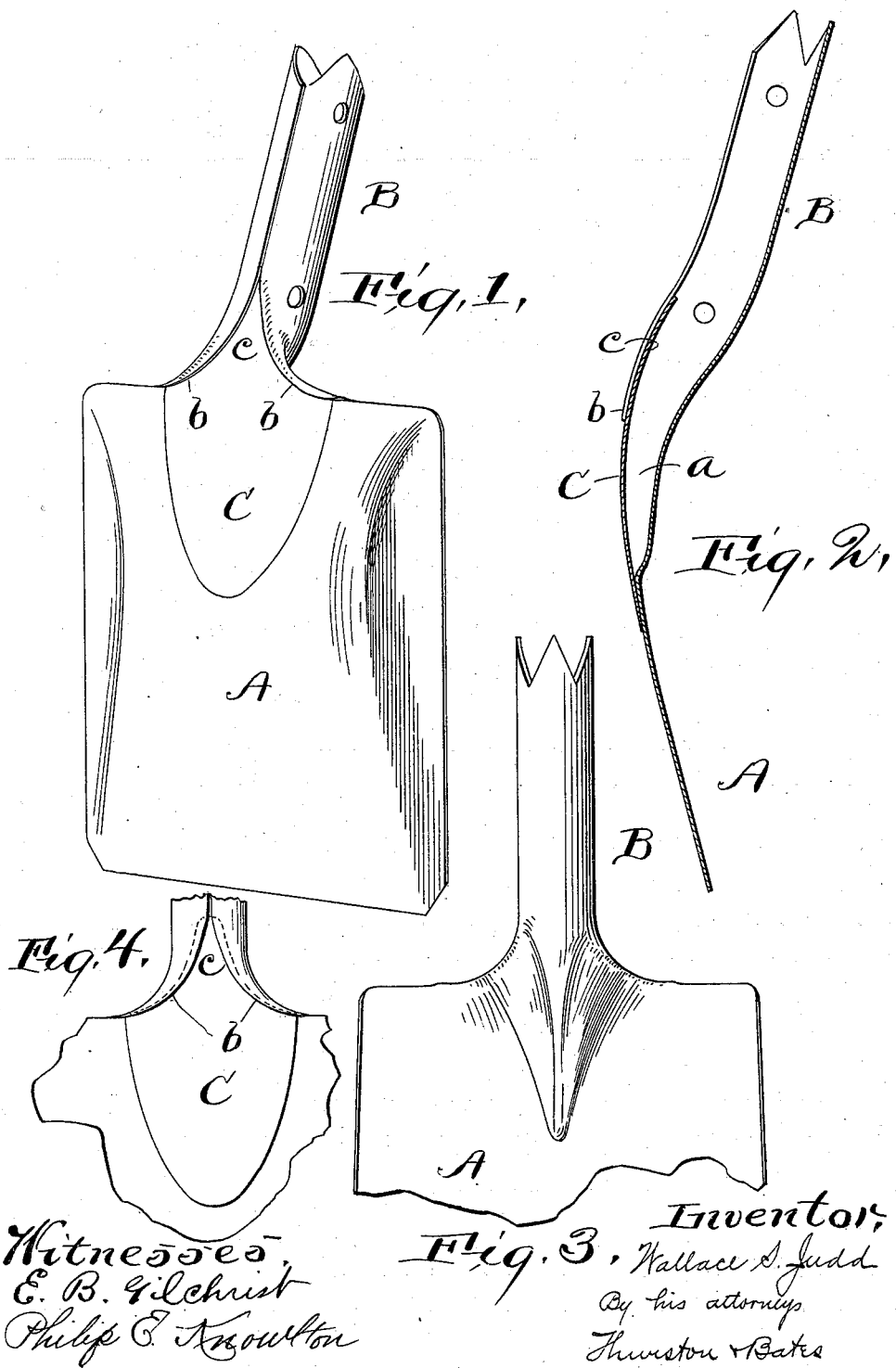

WALLACE S. JUDD, OF CLEVELAND, OHIO, ASSIGNOR TO THE AVERY STAMPING COMPANY, OF SAME PLACE.

SHOVEL.

SPECIFICATION forming part of Letters Patent No. 657,422, dated September 4, 1900.

Application filed June 20, 1898. Serial No. 683,981. (No model.)

*To all whom it may concern:*

Be it known that I, WALLACE S. JUDD, a citizen of the United States, residing at Cleveland, in the county of Cuyahoga and State of Ohio, have invented a certain new and useful Improvement in Shovels, of which the following is a full, clear, and exact description, reference being had to the accompanying drawings.

The invention relates to improvements in shovels, including various specific forms of shovels which have been given distinguishing names, such as "spades," "scoops," &c.

The invention consists in the construction and combination of parts hereinafter described and claimed.

In the drawings, Figure 1 is a perspective rear view of a shovel embodying my invention. Fig. 2 is a central longitudinal sectional view of the shovel. Fig. 3 is a front view of the upper part of the shovel, and Fig. 4 is a rear view of a part of said upper end.

The shovel is made from sheet metal. The blade A is provided with a centrally-placed integral shank B, whose lower side edges $b$ $b$ are curved apart and toward the top edge of the blade. A central longitudinal recess $a$ is pressed into the rear side of the blade, extending from the top downward for nearly one-half the length of the blade. This recess is covered by a plate C, which has a short tapered integral upward extension $c$, the edges of which are curved toward each other, as shown. The sides of the plate are welded to the back of the shovel, and the shank of the blade is bent backward until its side edges are substantially in contact, and its lower curved edges are bent down over the curved edges of the upward extension $c$ of plate C. This completely closes the recess in the back of the shovel-blade and also forms out of the shank B a complete tubular socket, into which a handle may be driven at any time.

It is believed that the described shovel is better than the prior shovels, which resemble it in some particulars. Prior shovels have had the blade-shank and the shank of the plate extended upward to form two straps between and to which the handle was secured; but it requires special machinery and skilled workmen to attach the handles to said straps, wherefore the handles are always attached before the shovels are carried from the shop to the storeroom. The result is that it requires a large amount of room to store any considerable quantity of such shovels and, besides, the shovel-handles get dirty by standing. On the contrary, the shovel herein described may be stored without the handles, because almost any one can drive the handles into the described sockets when they are needed, and in the meantime the handles may be kept clean. The handles of the strap-shovels are, moreover, always more or less rough at the point where they lie between the straps, whereas the shovel shown and described herein has a smooth socket for the hand of the user to grasp. It is also believed that the shovel described is stronger than the shovels which have been made heretofore, because the socket for the handle is a one-piece tube which embraces the handle at the point where the greatest strain is applied.

Having described my invention, I claim—

1. A shovel-blade having an integral cylindrical socket and a central depression in the rear side thereof at the juncture with said socket, the rear edges of said socket flaring downwardly and outwardly above said depression, combined with a backing-plate behind said depression having a tongue lying within said socket against its rear side, the edges of said tongue flaring outwardly and lying beneath the flared edges of said socket to form a support therefor, substantially as described.

2. A shovel-blade A having an integral socket B and a central depression in the rear side thereof at the juncture of said socket and blade, the rear edges $b$ of said socket flaring downwardly and outwardly above said depression, combined with a backing-plate C behind said depression and having a tongue $c$ projecting within said socket, the upper edges of said tongue lying beneath the flared edges of said socket, said plate C being curved but in a vertical plane only whereby it unites with said blade to form a substantially-flat back therefor, substantially as described.

In testimony whereof I hereunto affix my signature in the presence of two witnesses.

WALLACE S. JUDD.

Witnesses:
E. L. THURSTON,
PHILIP E. KNOWLTON.